(12) United States Patent
Zhang et al.

(10) Patent No.: US 9,246,662 B2
(45) Date of Patent: Jan. 26, 2016

(54) MECHANISMS ADDRESSING DYNAMIC COMPONENT CARRIER CHANGE IN RELAY SYSTEMS

(75) Inventors: Shun Liang Zhang, Beijing (CN); Lei Du, Beijing (CN); Simone Redana, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 80 days.

(21) Appl. No.: 14/356,190

(22) PCT Filed: Nov. 4, 2011

(86) PCT No.: PCT/CN2011/081788
§ 371 (c)(1),
(2), (4) Date: May 5, 2014

(87) PCT Pub. No.: WO2013/063792
PCT Pub. Date: May 10, 2013

(65) Prior Publication Data
US 2014/0307586 A1  Oct. 16, 2014

(51) Int. Cl.
*H04L 12/26* (2006.01)
*H04W 4/00* (2009.01)
(Continued)

(52) U.S. Cl.
CPC ............ *H04L 5/0085* (2013.01); *H04L 5/0098* (2013.01); *H04L 5/14* (2013.01);
(Continued)

(58) Field of Classification Search
CPC ..... H04W 28/00; H04W 36/04; H04W 36/06; H04W 36/08; H04W 36/14; H04W 36/24; H04W 48/20; H04W 52/40; H04W 64/00; H04W 72/00; H04W 72/005; H04W 72/04; H04W 72/0406; H04W 72/0426; H04W 72/0453; H04W 76/002; H04W 76/025; H04W 84/047; H04W 88/02; H04W 88/04; H04W 88/08; H04L 5/001; H04L 5/0023; H04L 5/0032; H04L 5/0035; H04L 5/0085; H04L 5/0098; H04L 5/14; H04L 27/2657; H04J 11/0053; H04B 7/15542

USPC ......... 370/241–258, 310–350, 401, 431–463; 455/7–17, 431–444, 450–464
See application file for complete search history.

(56) References Cited

U.S. PATENT DOCUMENTS

| 8,755,326 B2 * | 6/2014 | Park ........................ H04L 5/001 370/315 |
| 8,811,268 B2 * | 8/2014 | Kim ..................... H04W 72/082 370/310.2 |
| 8,995,393 B2 * | 3/2015 | Siomina ................ G01S 5/0236 370/331 |

(Continued)

FOREIGN PATENT DOCUMENTS

| WO | WO 2011/025340 A2 | 3/2011 |
| WO | WO 2011/051921 A2 | 5/2011 |

OTHER PUBLICATIONS

International Search Report dated Aug. 16, 2012 corresponding to International Patent Application No. PCT/CN2011/081788.

(Continued)

*Primary Examiner* — Tri H Phan
(74) *Attorney, Agent, or Firm* — Squire Patton Boggs (US) LLP

(57) ABSTRACT

The present invention proposes methods and devices to further improve relay systems operating on the basis of carrier aggregation on the access as well as on the backhaul link. Under an aspect of such approach, there is proposed a relay node as a device, comprising a transceiver device, configured to communicate via a first interface with a terminal and via a second interface with a remote network device, wherein communication via the first and/or second interface is configured to operate based on aggregation of plural individual component carriers, and a control device, configured to perform, per component carrier: detection of a change concerning a component carrier on the first interface, sending, responsive thereto, of update information pertaining to at least the first interface towards the remote network device, reception of reconfiguration instructions, implied by the detected change, to be applied on the first interface, and initiation of reconfiguration of the first interface based on the received instructions. Similar approach is applied to a donor eNB as well as to corresponding methods and computer program products.

21 Claims, 10 Drawing Sheets

(51) Int. Cl.
*H04L 12/28* (2006.01)
*H04W 36/00* (2009.01)
*H04L 5/00* (2006.01)
*H04L 5/14* (2006.01)
*H04W 88/04* (2009.01)
*H04W 72/04* (2009.01)
*H04W 84/04* (2009.01)
*H04B 7/155* (2006.01)

(52) U.S. Cl.
CPC .......... *H04W 88/04* (2013.01); *H04B 7/15542* (2013.01); *H04L 5/001* (2013.01); *H04L 5/0032* (2013.01); *H04W 72/0406* (2013.01); *H04W 84/047* (2013.01)

(56) References Cited

U.S. PATENT DOCUMENTS

| | | | | |
|---|---|---|---|---|
| 9,083,497 | B2* | 7/2015 | Lee | H04W 72/0406 |
| 9,112,644 | B2* | 8/2015 | Seo | H04L 5/001 |
| 9,130,720 | B2* | 9/2015 | Lee | H04W 72/0406 |
| 2012/0307715 | A1* | 12/2012 | Maeda | H04L 5/001 370/315 |
| 2013/0142136 | A1* | 6/2013 | Pi | H04W 28/0289 370/329 |
| 2014/0301371 | A1* | 10/2014 | Maeda | H04W 36/0011 370/331 |

OTHER PUBLICATIONS

Volker Braun et al., "Relay Networks Specific Resource Management Features", D3.3_v2.0.doc, chapter 3.3.1, May 2, 2011, pp. 1-87.

* cited by examiner (Relay system architecture)

change from inband to outband relay system on CC1 change from outband to inband relay system on CC1 change from outband to inband relay system on CC1 due to CC change on backhaul link change from inband to outband relay system on CC1 due to CC change on backhaul link Fig. 6 RRC based approach RN capability transfer process

MECHANISMS ADDRESSING DYNAMIC COMPONENT CARRIER CHANGE IN RELAY SYSTEMS

FIELD OF THE INVENTION

The present invention relates to mechanisms addressing dynamic component carrier change in relay systems. In particular, it addresses activities and signaling of entities and/or devices forming part of such relay systems such as a relay node and associated network transceiver station.

BACKGROUND

Mobile data transmission and data services are constantly making progress. At least in the framework of the currently discussed/developed standard of LTE/LTE-A (Long Term Evolution/LTE-Advanced) in mobile telecommunication, relay systems are studied.

In such relay systems, a relay node RN acts as a transceiver station (like evolved Node_B, eNB) towards a terminal device (such as a user equipment, UE). On the other hand, such relay node relays or propagates signals it receives from a network transceiver device which is referred to as "donor" evolved Node_B, DeNB, and which insofar "donates" resources to the relay node.

It should be noted that in this application, LTE/LTE-A is referred to as a mere example only and that other standards may apply relaying. Hence, insofar as such other standards and/or systems apply relaying in a similar environment as discussed herein below, principles and/or embodiments taught by this invention may likewise be applicable to such other environments under another standard/system. In order to prevent the description from becoming too complex, however, for explanatory purposes, reference is made to LTE/LTE-A, and at least partly also the corresponding terminology is applied.

Relaying is considered for LTE-Advanced as a tool to improve features such as e.g. the coverage of high data rates, group mobility, temporary network deployment, the cell-edge throughput and/or to provide coverage in new areas. Relaying as an important topic for Release 10 has been extensively discussed in 3GPP ($3^{rd}$ Generation Partnership Project). In a relay system, the relay node RN acts as a UE from the DeNB point of view, while it behaves as an eNB for UEs served by the RN. Therefore, the RN supports eNB functionality as well as UE functionality.

FIG. 1 shows an exemplary architecture of a relaying system and elements constituting the relay system and interfaces there between. As shown in FIG. 1, mobility management entities/serving gateways MME/S-GW are connected to an evolved Node_B, eNB, or a Donor evolved Node_B, DeNB. A connection from a MME/S-GW towards an eNB is achieved via an interface S1, whereas a connection from an MME/S-GW towards a Donor eNB, DeNB, is accomplished using an interface S11. Since a Donor eNB may act as a "conventional" eNB as well as a Donor eNB, DeNB, this one is connected via both interfaces S1 and S11 to a respective MME/S-GW. A connection between a conventional eNB and a Donor eNB, DeNB, is accomplished using an interface X2. Likewise, a Un interface interconnects a relay node RN and a Donor eNB, DeNB. The Un interface carries the X2 interface and S1 interface between the RN and the DeNB. The interfaces used for interconnection also represent to a certain extent the layer in the OSI (open system interconnection) signaling model on which these interfaces are applied. The relay node RN, the eNB, and the DeNB at least constitute the evolved UTRAN (E-UTRAN), i.e. the evolved universal terrestrial radio access network. Furthermore, the relay node relays signaling to and from a terminal such as user equipment UE from and to the DeNB. The interface between the user equipment UE and the relay node RN is referred to as Uu interface, which is the same interface as between an eNB and a UE. For the following description, the interface or link between UE and RN is also referred to as access link, whereas the interface between RN and DeNB, in particular the Un interface thereof, is referred to as backhaul link. The interface or link between DeNB and UE is also referred to as direct link.

A relay node thus represents a device comprising a transceiver device, configured to communicate via a first interface (access link) Uu with a terminal and via a second interface (backhaul link) Un with a remote network device DeNB.

One critical issue of a relay system is the capacity of the backhaul link, which may be shared by many relay nodes. For capacity enhancement scenarios, the backhaul link of relay system is a potential bottleneck of relay system. To solve the bottleneck issue, applying multiple component carriers to the relay backhaul link is considered as an appealing approach. Applying principles of carrier aggregation CA to the relay system has not been investigated in Release 10 of LTE. Given that a framework for CA and a basic process of CA operation has meanwhile been determined by 3GPP in Rel10, but not for relay systems, it is useful to investigate the potential issues on applying CA also to relay systems.

However, in connection with carrier aggregation, issues in relation to a dynamic change of aggregated carriers will have to be solved. Dynamic component carrier change may affect the access link as well as backhaul link, i.e. a change on the access link may impact the backhaul link and vice versa. Hence, in regard of applying multiple component carriers to relay system, several different deployment scenarios need to be considered. Among them, multiple component carriers could be applied to backhaul link only, or to relay access link only, or to both relay access link and backhaul link.

When carrier aggregation is configured, the UE only has one RRC (radio resource control) connection with the network. At RRC connection establishment/re-establishment/handover, one serving cell provides the NAS (network access stratum) mobility information (e.g. TAI (timing advance information)), and at RRC connection re-establishment/handover, one serving cell provides the security input. This cell is referred to as the Primary Cell (PCell). In the downlink, the carrier corresponding to the PCell is the Downlink Primary Component Carrier (DL PCC), while in the uplink it is the Uplink Primary Component Carrier (UL PCC). Depending on UE capabilities, Secondary Cells (SCells) can be configured to form together with the PCell a set of serving cells. In the downlink, the carrier corresponding to an SCell is a Downlink Secondary Component Carrier (DL SCC) while in the uplink it is an Uplink Secondary Component Carrier (UL SCC). For the sake of brevity, in the following description PCell and SCell, respectively, are used.

According to the assumption in 3GPP for LTE Release 10 on carrier aggregation, it is possible that a SCell can be activated and deactivated dynamically by the network side (control entities) based on downlink DL and uplink UL traffic requirement of terminals such as UEs. To dynamically change the number of CCs on the radio link between eNB and UE (direct link), the radio resource control, RRC, reconfiguration process has been improved to add/modify/release secondary cells SCells of a UE and specific MAC CE (media access control control elements) have been introduced to activate/deactivate the configured secondary cells.

Since the RN could be considered as an eNB, the carrier aggregation can in principle be applied to the Uu radio link between RN and UE (access link). Likewise, by taking RN as a normal UE the carrier aggregation can in principle also be applied to the Un radio link between DeNB and RN (backhaul link). However, the Rel.10 specifications support CA on the backhaul and access fink but what is done on one link does not have to impact the other link. This makes CA not usable in relay deployment because we need to have disjoint sets of CCs for the backhaul and access links.

However, when taking a closer look at dynamic component carrier change on a relay system's access link, some potential issues have to be considered because of the potential impact to the relay backhaul link, and vice versa, in case of dynamic component carrier change on the backhaul link, some potential issues have to be considered because of the potential impact to the access link.

To explain related issues more clearly, the following FIGS. 2 to 5 are used as possible examples. "Inband" refers to a scenario in which the backhaul link and access link rely on the same component carrier CC, while "outband" refers to a scenario in which the backhaul link and access link rely on a different component carrier CC.

FIG. 2 illustrates a change from inband to outband relay system on CC1. As shown in FIG. 2, during a startup phase, the RN indicates its resource partitioning request on CC1 to DeNB because CC1 is also used as PCell on the access link towards the UE (see FIG. 2(a)). However, during operation phase, the RN may decide to change the PCell of the UE over access link from CC1 to CC3 due to some reasons, such as interference avoidance (see FIG. 2(b)). After the PCell is moved from CC1 to CC3, resource partitioning would not be necessary anymore on CC1. Therefore, the issue is how to inform the DeNB that resource partitioning request on CC1 is not needed anymore during the operation period.

FIG. 3 illustrates a change from outband to inband relay system on CC1. Similar to the previous scenario, in the scenario shown in FIG. 3, after moving PCell of the UE over the access link from CC3 (see FIG. 3(a)) to CC1 (see FIG. 3(b)), the relay system is changed from outband system to inband system on CC1. After the change, the resource partitioning would be necessary on CC1. Similarly, it is an issue how to inform the changed resource partitioning request to DeNB.

According to current specifications in LTE Release 10, a resource partitioning request is only informed to DeNB during RRC connection establishment process, i.e. in the RRC Connection Setup Complete message. After that it is not necessary to change a resource partitioning request because the support of carrier aggregation in relay deployment was not a requirement in Release 10. Therefore, the existing mechanism specified in Rel.10 for a single CC used, both on the access and backhaul link (other CCs can be used on the backhaul and access links but they have to be different), can't be used to solve the issue of a relay system with multiple component carriers on the access link that are also used on the backhaul link.

Similarly, a CC change on a RN's backhaul link is also possible. To illustrate related issues more clearly, the following figures show possible scenarios of a change on a relay node's backhaul link during relay operation mode.

According to the current Re1.10 specifications, a resource partitioning is provided by the DeNB to the RN via RN Reconfiguration message. The message contains the Frequency-Division-Duplex (FDD)/Time-Division-Duplex (TDD) subframe configuration (the resource partitioning, FDD is case of FDD system or TDD in case of TDD system) and the Relay-Physical Downlink Control Channel (R-PDCCH) configuration. The message can also be used to convey the System Information Block Type1 (SIB1) and System Information Block Type2 (SIB2).

FIG. 4 illustrates a change from outband to inband relay system on CC1 due to a component carrier change on the backhaul link. According to the existing specification, with only a single CC used both on the backhaul and access link, during RN startup phase the RN indicates its resource partitioning request to DeNB. However, in the context of multiple CCs, when the additional CC that is also used on the access link (as CC1 in the example shown in FIG. 4(b)) is needed to be activated on the backhaul link due to some reasons, it is not addressed how the DeNB knows about the RN's capability, i.e. whether resource partitioning is needed, on CC1 and how it provides appropriate configuration accordingly. Additionally, if resource partitioning is needed for more than one component carriers, how to provide the configuration is another problem.

FIG. 5 illustrates a change from inband to outband relay system on CC1 due to a component carrier change on the backhaul link.

As shown in FIG. 5, it is possible that a SCell (CC1 as shown in FIG. 5(a)) is removed on the backhaul link. After CC1 is removed, the resource partitioning on the RN's access link is not necessary anymore. It is thus an issue to provide for means to release the configured Un subframe info applied on RN's access link. Again, if resource partitioning is applied for more than one component carriers, how to change the configurations is another problem.

Currently, the configured RN subframe configuration (on the backhaul link) including the FDD/TDD subframe configuration and the R-PDCCH configuration are only released when the RRC connection is released. Definitely, it is not considered a good solution to terminate the entire RRC connection that is shared by all CCs on the backhaul link.

In summary, when carrier aggregation CA is considered in relay systems on the access and backhaul link, it is likely that some SCell is to be added, modified or removed on either backhaul link or access link. Since in current specifications, the negotiation on resource partitioning only takes place in the beginning of a RRC Connection establishment procedure, it needs to be addressed how to configure the subframe partitioning when a new SCell is added or removed or otherwise modified, and how to configure the subframe partitioning for more than one component carriers.

To the inventors' knowledge, during discussion in Release 10 related to the relay system, there are also some proposals on how the RN's capability info is exchanged between the RN and DeNB. According to one proposal (e.g. in R2-104541), several alternative approaches have been proposed to exchange RN's capability info to the DeNB. However, all these proposals are focused on the RN startup phase, which can't be used during the RN's operation phase because the RN's capability info or resource partitioning info would be changed with the CC change on RN's access link and/or backhaul link.

Therefore, there is a need for new approaches to be explored to solve the issues during RN operation phase.

Thus, there is still a need to further improve such relay systems operating on the basis of carrier aggregation on the access as well as on the backhaul link.

SUMMARY

Various aspects of examples of the invention are set out in the claims.

According to a first (device related) aspect of the present invention, there is provided
a device, comprising a transceiver device, configured to
communicate via a first interface with a terminal and via
a second interface with a remote network device,
wherein communication via the first and/or second interface is configured to operate based on aggregation of plural individual component carriers, and a control device, configured to perform, per component carrier: detection of a change concerning a component carrier on the first interface, sending, responsive thereto, of update information pertaining to at least the first interface towards the remote network device, reception of reconfiguration instructions, implied by the detected change, to be applied on the first interface, and initiation of reconfiguration of the first interface based on the received instructions.

The device according to the first aspect,
wherein the control device may be configured to send the update information as an update request using a radio resource control message towards the remote network device, or to send the update information as device capability information update using a capability information message towards the remote network device, or to send the update information as an application protocol message conformant to the application protocol applied for communication on the second interface towards the remote network device, or to send the update information as a status report message using a media access control message;
wherein the update information may include the device's configuration update request related to active component carriers on the first interface;
wherein the update information may include a proposed device configuration, comprising at least one of a FDD/TDD sub-frame configuration and an R-PDCCH related to active component carriers on the first interface;
wherein the update information may be sent only when the device configuration needs to be changed due to a change concerning a component carrier on the first interface;
wherein a control device may be configured to perform, per component carrier, reception of a reconfiguration request from the remote network device, implied by a detected change to be applied on the second interface, sending, responsive thereto, of update information pertaining to at least the first interface towards the remote network device, reception of reconfiguration instructions, implied by the detected change on the second interface, for being applied on the first interface, and initiation of reconfiguration of the first interface based on the received instructions;
wherein the control device may be configured to send the update information as an update request using a radio resource control message towards the remote network device, or to send the update information as device capability information update using a capability information message towards the remote network device, or to send the update information as an application protocol message conformant to the application protocol applied for communication on the second interface towards the remote network device, or to send the update information as a status report message using a media access control message;
wherein the control device may be further configured to perform conditional updating of resource partitioning information towards the remote device, if such information has not been previously already reported;
wherein the control device may be configured to perform, per component carrier, reception of a capability information update request from the remote network device, and sending, responsive thereto, of a capability information update pertaining to at least the first interface of the device, towards the remote network device; and
wherein the device may comprise a relay node.

According to a second (device related) aspect of the present invention, there is provided a device, comprising a transceiver device, configured to communicate via a second interface with a remote device configured to communicate via a first interface with a terminal, wherein communication via the first and/or second interface is configured to operate based on aggregation of plural individual component carriers, and a control device, configured to perform, per component carrier: receiving of update information pertaining to at least the first interface from the remote device, sending of reconfiguration instructions to the remote device for being applied on the first interface, and initiation of reconfiguration of the second interface based on the received update information and/or reconfiguration instructions sent to the remote device.

The device according to the second aspect,
wherein the control device may be configured to receive the update information as an update request using a radio resource control message from the remote device, or to receive the update information as device capability information update using a capability information message from the remote device, or to receive the update information as an application protocol message conformant to the application protocol applied for communication on the second interface from the remote device, or to receive the update information as a status report message using a media access control message;
wherein the control device may be configured to perform, per component carrier, detection of a change concerning a component carrier on the second interface, sending of a reconfiguration request from the device, implied by a detected change to be applied on the second interface, receiving, responsive thereto, of update information pertaining to at least the first interface from the device, sending of reconfiguration instructions, implied by the detected change on the second interface, for being applied on the first interface, and initiation of reconfiguration of the second interface based on the detected change and/or reconfiguration instructions sent;
wherein the control device may be configured to receive the update information as an update request using a radio resource control message towards the remote network device, or to receive the update information as device capability information update using a capability information message towards the remote network device, or to receive the update information as an application protocol message conformant to the application protocol applied for communication on the second interface towards the remote network device, or to receive the update information as a status report message using a media access control message;
wherein the control device may be configured to perform, per component carrier, sending of a capability information update request to the remote device, and receiving, responsive thereto, of a capability information update pertaining to at least the first interface of the device, from the remote device, deciding the reconfiguration of the second interface based on the received capability information; and
wherein the device may comprise an eNodeB.

According to a third (method related) aspect of the present invention, there is provided
a method, comprising: communicating via a first interface with a terminal and via a second interface with a remote network device, wherein communication via the first and/or second interface is based on aggregation of plural individual component carriers, and performing, per component carrier: detecting of a change concerning a component carrier on the first interface, sending, responsive thereto, of update information pertaining to at least the first interface towards the remote network device, receiving of reconfiguration instructions, implied by the detected change, to be applied on the first interface, and initiating reconfiguration of the first interface based on the received instructions.

The method according to the third aspect, the method may further comprise sending the update information as an update request using a radio resource control message towards the remote network device, or sending the update information as device capability information update using a capability information message towards the remote network device, or sending the update information as an application protocol message conformant to the application protocol applied for communication on the second interface towards the remote network device, or sending the update information as a status report message using a media access control message;

wherein the update information may include the device's configuration update request related to active component carriers on the first interface; and wherein the update information may include a proposed device configuration, comprising at least one of a FDD/TDD sub-frame configuration and an R-PDCCH related to active component carriers on the first interface.

The method may further comprise sending the update information is only when the device configuration needs to be changed due to a change concerning a component carrier on the first interface.

The method may further comprise performing, per component carrier, receiving a reconfiguration request from the remote network device, implied by a detected change to be applied on the second interface, sending, responsive thereto, of update information pertaining to at least the first interface towards the remote network device, reception of reconfiguration instructions, implied by the detected change on the second interface, for being applied on the first interface, and initiating reconfiguration of the first interface based on the received instructions.

The method may further comprise sending the update information as an update request using a radio resource control message towards the remote network device, or sending the update information as device capability information update using a capability information message towards the remote network device, or sending the update information as an application protocol message conformant to the application protocol applied for communication on the second interface towards the remote network device, or sending the update information as a status report message using a media access control message.

The method may further comprise conditional updating of resource partitioning information towards the remote device, if such information has not been previously already reported.

The method may further comprise performing, per component carrier, receiving a capability information update request from the remote network device, and sending, responsive thereto, of a capability information update pertaining to at least the first interface of the device, towards the remote network device.

According to a fourth (method related) aspect of the present invention, there is provided a method, comprising: communicating via a second interface with a remote device configured to communicate via a first interface with a terminal, wherein communication via the first and/or second interface is configured to operate based on aggregation of plural individual component carriers, and performing, per component carrier: receiving update information pertaining to at least the first interface from the remote device, sending reconfiguration instructions to the remote device for being applied on the first interface, and initiating reconfiguration of the second interface based on the received update information and/or reconfiguration instructions sent to the remote device.

The method according to the fourth aspect, the method may further comprise receiving the update information as an update request using a radio resource control message from the remote device, or receiving the update information as device capability information update using a capability information message from the remote device, or receiving the update information as an application protocol message conformant to the application protocol applied for communication on the second interface from the remote device, or receiving the update information as a status report message using a media access control message.

the method may further comprise performing, per component carrier, detecting a change concerning a component carrier on the second interface, sending a reconfiguration request from the device, implied by a detected change to be applied on the second interface, receiving, responsive thereto, of update information pertaining to at least the first interface from the device, sending reconfiguration instructions, implied by the detected change on the second interface, for being applied on the first interface, and initiating reconfiguration of the second interface based on the detected change and/or reconfiguration instructions sent.

the method may further comprising receiving the update information as an update request using a radio resource control message towards the remote network device, or receiving the update information as device capability information update using a capability information message towards the remote network device, or receiving the update information as an application protocol message conformant to the application protocol applied for communication on the second interface towards the remote network device, or receiving the update information as a status report message using a media access control message.

the method may further comprise performing, per component carrier, sending a capability information update request to the remote device, and receiving, responsive thereto, of a capability information update pertaining to at least the first interface of the device, from the remote device, deciding the reconfiguration of the second interface based on the received capability information.

According to a fifth aspect of the present invention, there are provided computer program products comprising computer-executable components which, when the program is run on a computer, are configured to execute the method aspects according to the third and the fourth aspect disclosed in relation to the operation of the relay node RN and the donor eNB DeNB, respectively.

The above computer program product/products may be embodied as a computer-readable storage medium.

The methods, devices and computer program products described in this document use, at least in exemplary embodiments, some methods which enable the negotiation and configuration for an added, released or modified component carrier on either the access link or backhaul link. These enable to provide for proper resource partitioning on the backhaul and access link in relay systems even during operation of the relay system. They remove the need to tear down an entire RRC connection and to rebuild a new RRC connection, thus at least temporarily disruption the RRC connection. Rather, at least individual ones of the proposed exemplary scenarios allow for a continuous operation of the relay systems using carrier aggregation even when a change in component carriers on either the access link or backhaul link occurs or needs to be initiated.

Thus, performance improvement is based on those methods, devices and computer program products enabling continuous operation of the relay systems using carrier aggregation even when a change in component carriers on either the access link or backhaul link occurs or needs to be initiated.

BRIEF DESCRIPTION OF DRAWINGS

For a more complete understanding of example embodiments of the present invention, reference is now made to the following descriptions taken in connection with the accompanying drawings in which.

DESCRIPTION OF EXEMPLARY EMBODIMENTS

Exemplary aspects of the invention will be described herein below.

Generally, the invention is implemented in a relay system comprising a relay node device, RN, and a remote network device (i.e. a Donor eNB), interfacing each other via a second interface (backhaul link), while the relay node interface a terminal such as UE via a first interface (access link). Carrier aggregation CA providing primary and secondary component carriers PCell, SCell, or CC in general, is applicable on both, the access link as well as the backhaul link.

While the relay system is described below with reference to a system based on LTE/LTE-A, the methods, devices and computer program products presented herein are generally applicable to other systems and/or standards may be applied to such relay systems applying carrier aggregation, while principles taught by at least exemplary embodiments relating to this invention remain applicable.

Other systems can benefit also from the principles presented herein as long as they have identical or at least similar properties in terms of architectural interrelation, functional procedures and rely on carrier aggregation on interfaces similar to those referenced herein.

Embodiments of the present invention may be implemented in software, hardware, application logic or a combination of software, hardware and application logic. The software, application logic and/or hardware generally reside on devices and or subsets like transceivers and/or modems thereof and/or controllers associated thereto. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

The present invention relates in particular but without limitation to mobile communications, for example to relay system environments based on carrier aggregation under WCDMA, LTE, WIMAX and WLAN and can advantageously be implemented in relay nodes RN and/or donor eNBs, DeNB,s connectable to such networks. That is, it can be implemented as/in chipsets to connected devices, and/or modems thereof. If desired, the different functions discussed herein may be performed in a different order and/or concurrently with each other. Furthermore, if desired, one or more of the above-described functions may be optional or may be combined.

Figure 1:
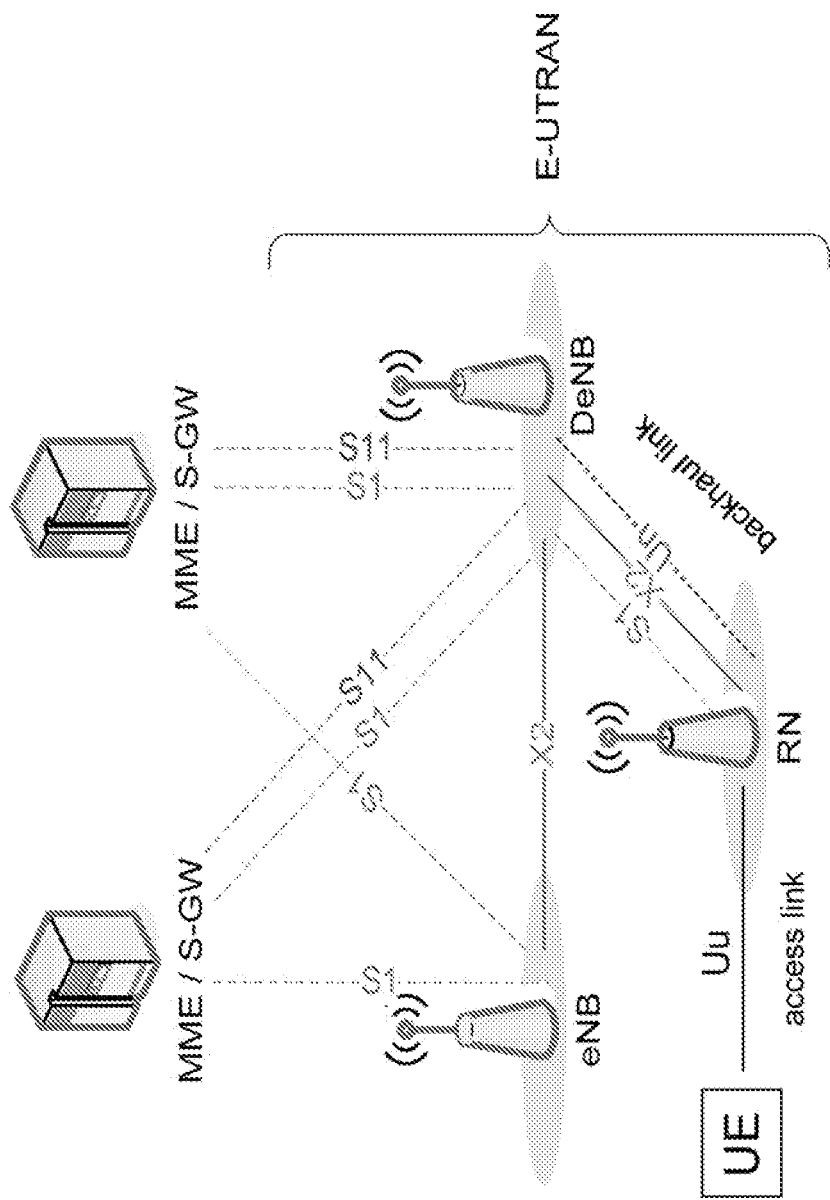
FIG. 1 illustrates an exemplary architecture of a relaying system.
Figure 2:
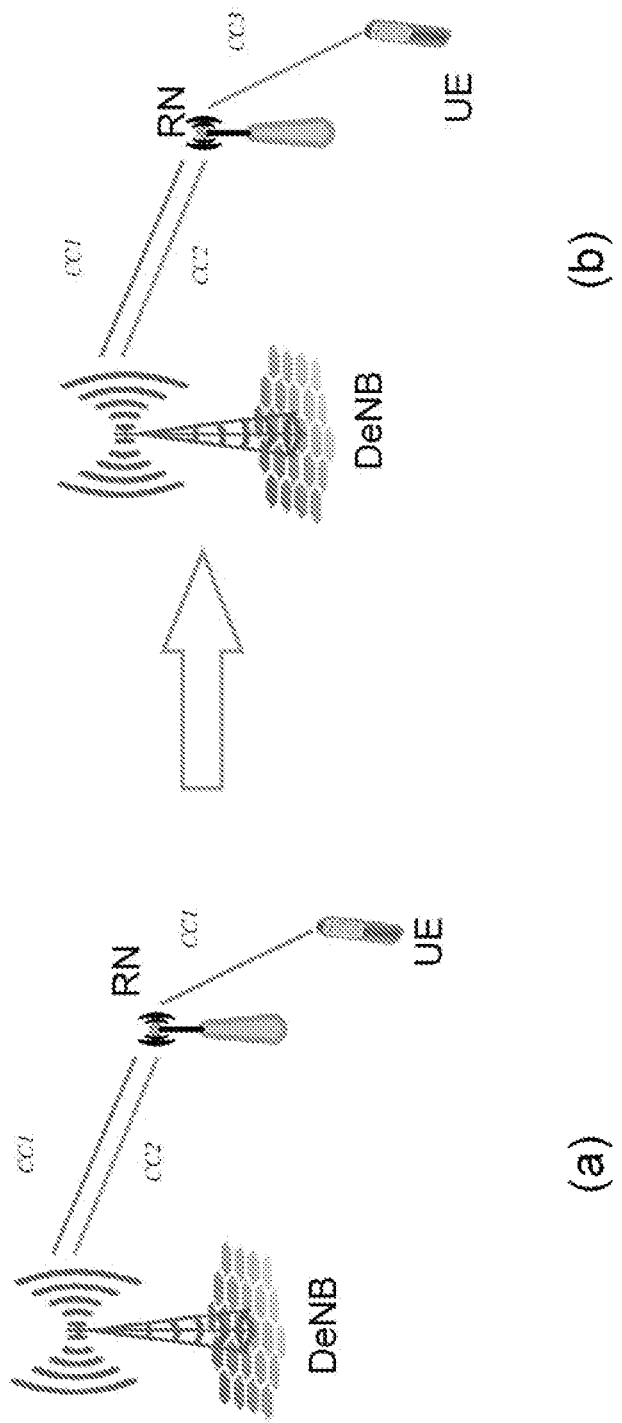
FIG. 2 illustrates a change from inband to outband relay system on CC1 due to a component carrier change on the access link.
Figure 3:
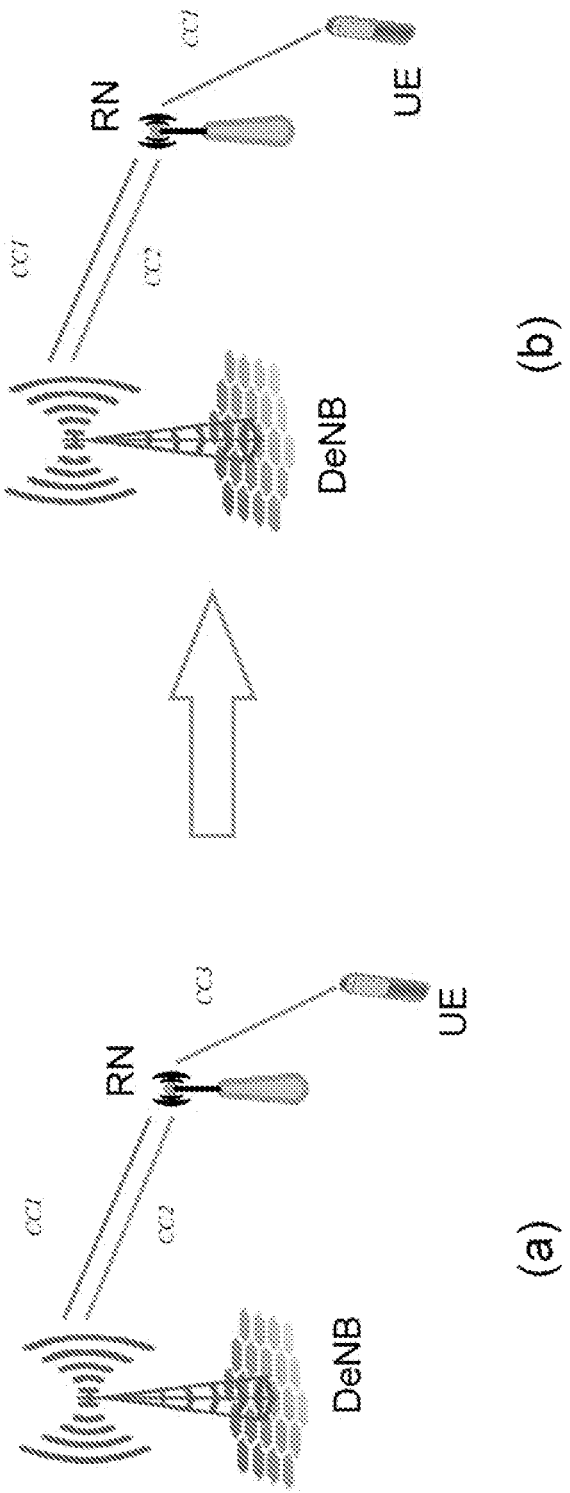
FIG. 3 illustrates a change from outband to inband relay system on CC1 due to a component carrier change on the access link.
Figure 4:
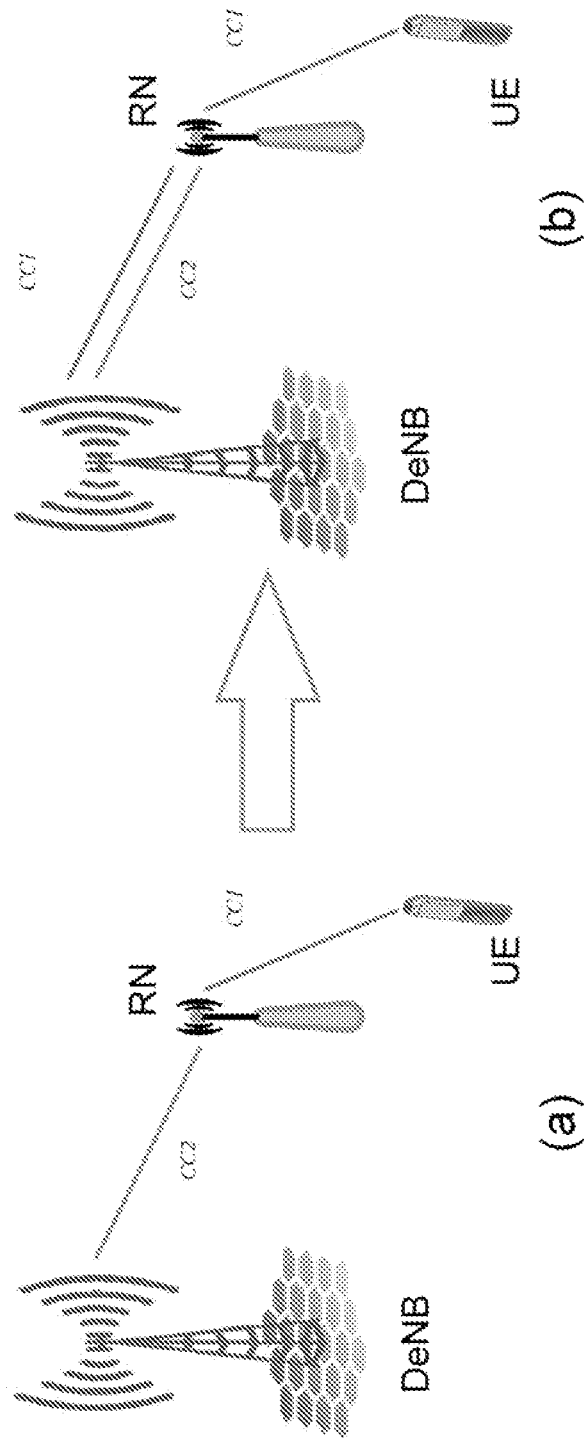
FIG. 4 illustrates a change from outband to inband relay system on CC1 due to a component carrier change on the backhaul link.
Figure 5:
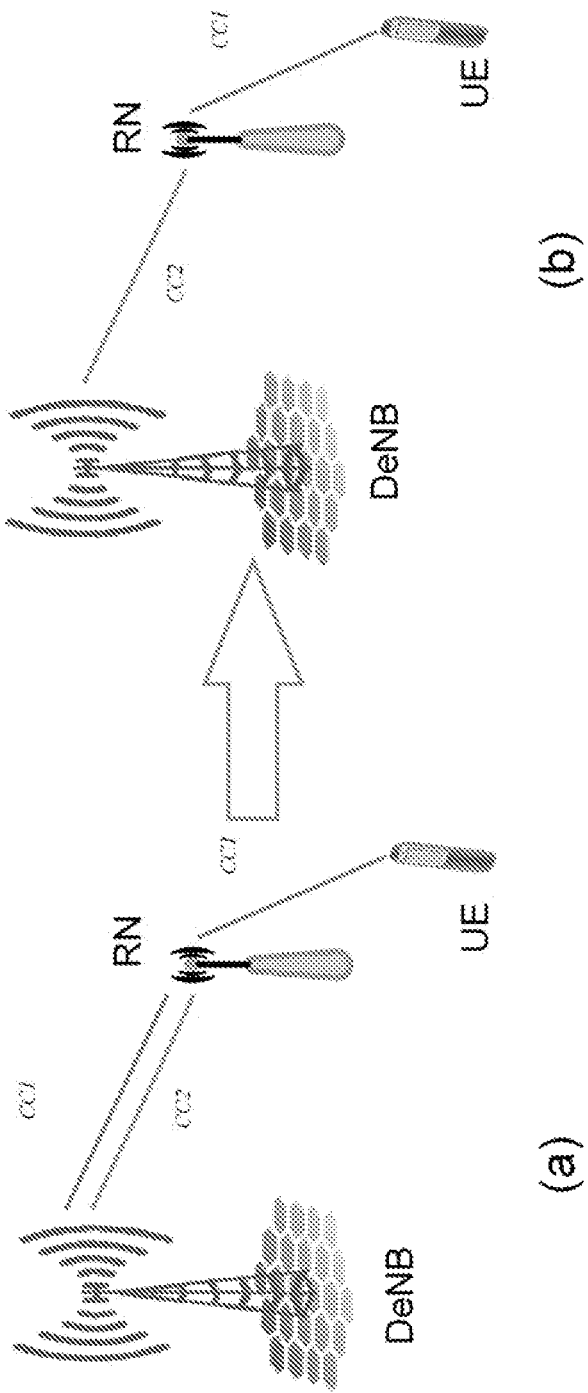
FIG. 5 illustrates a change from inband to outband relay system on CC1 due to a component carrier change on the backhaul link
Figure 6:
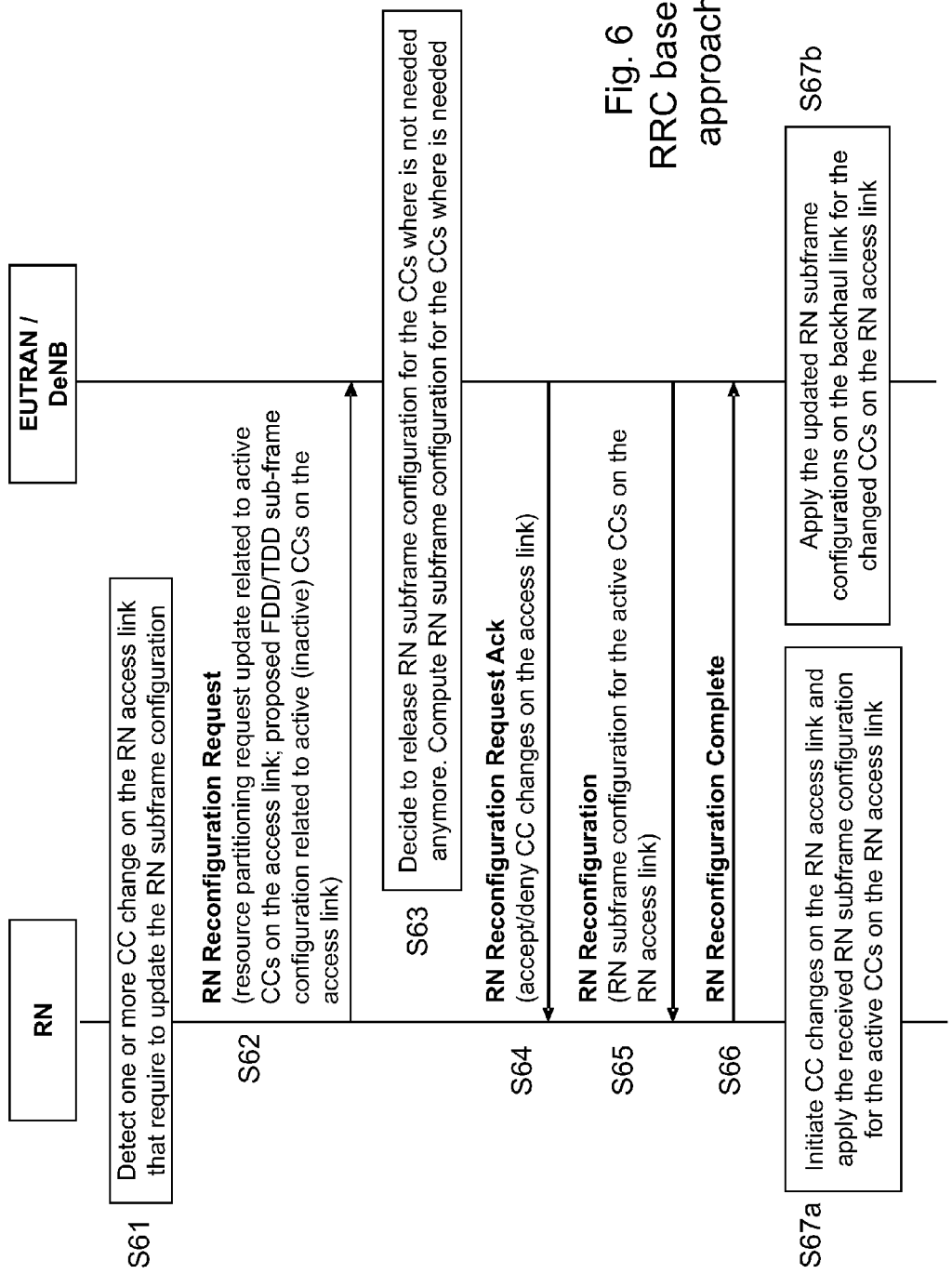
FIG. 6 illustrates an RRC based approach as an exemplary embodiment.
Figure 7:
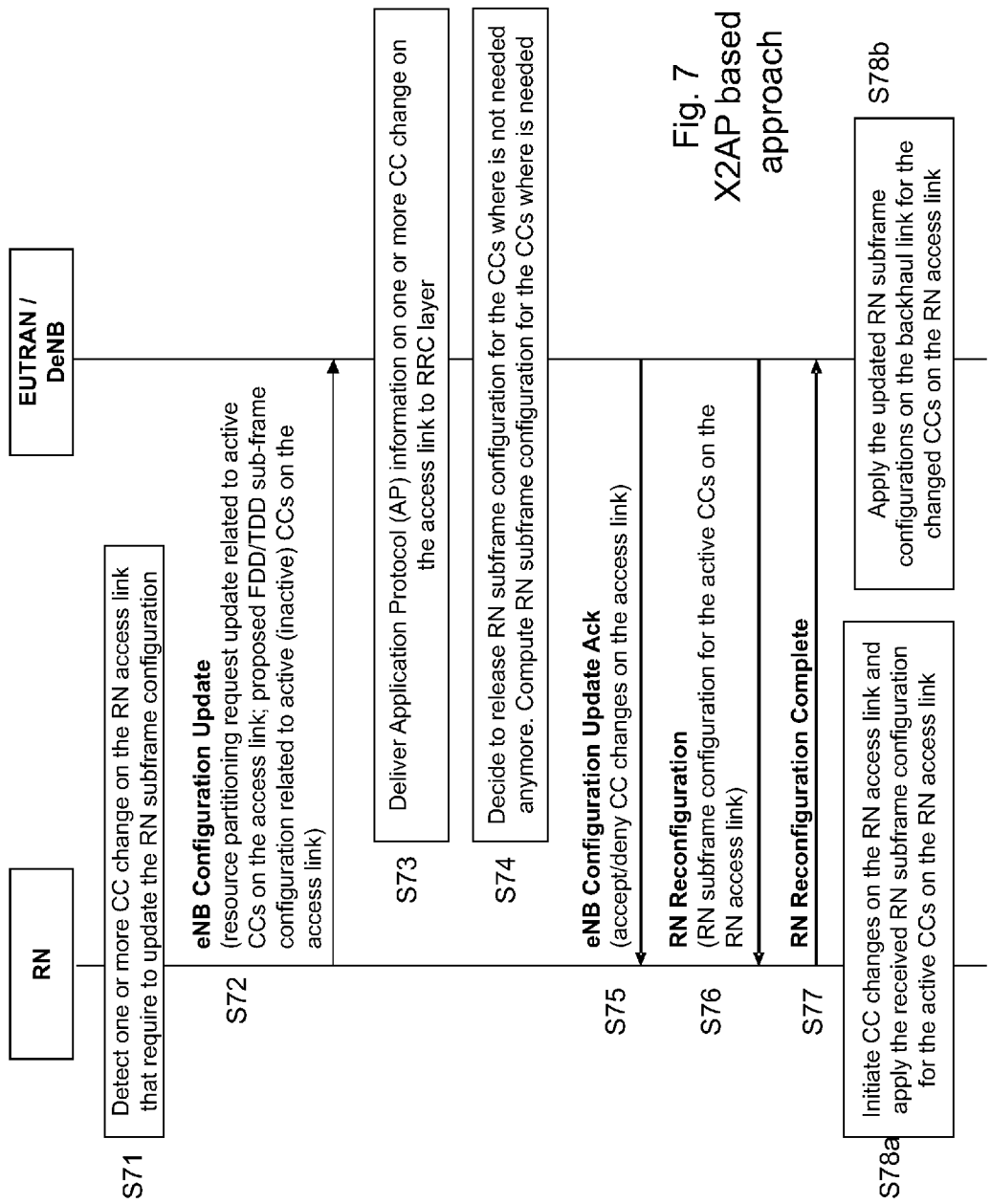
FIG. 7 illustrates an X2 application protocol based approach as another exemplary embodiment.
Figure 8:
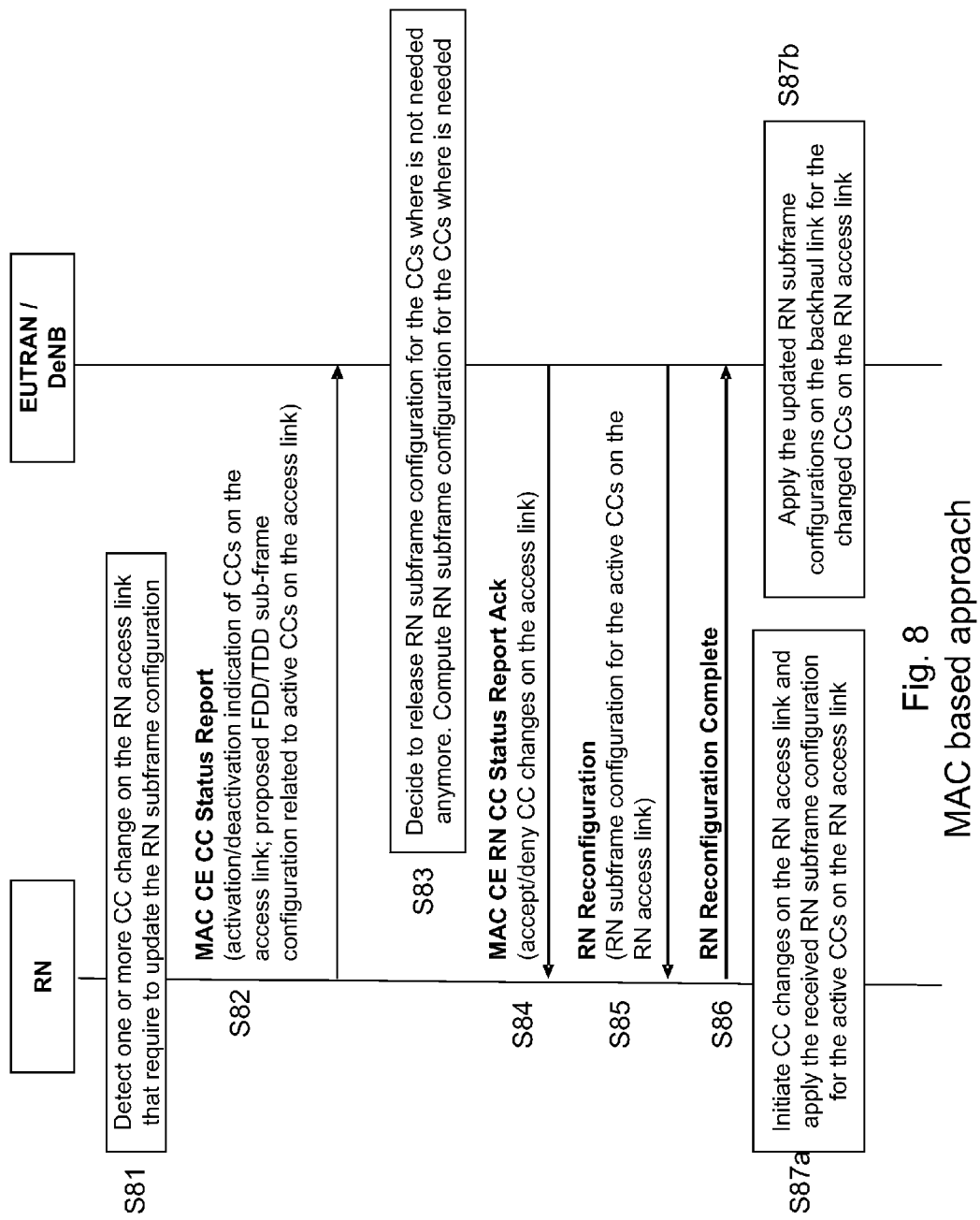
FIG. 8 illustrates a MAC based approach as another exemplary embodiment.

Embodiments Related to Access Link Related Scenarios (FIGS. 6 to 8)

To solve the identified issues of applying multiple component carriers on the access link of a relay system that are also used on the backhaul link, it is proposed that a relay node RN indicates to a donor eNB, DeNB, whether a RN subframe configuration (including FDD/TDD subframe configuration and R-PDCCH configuration) is required for the backhaul CCs due to the changes on the access link.

In the following, alternative mechanisms are outlined.

Exemplary Embodiment 1

RRC Based Approach (see FIG. 6)

A new RRC layer process is defined, and it is initiated for the RN to indicate (upon it has detected, S61, one or more changes on the access link that occurred or are necessary to occur and resource partitioning needs to be updated) a change request, S62, for RN subframe configuration (from not necessary to necessary or vice versa). A change is detected/signaled per CC depending on the activation or deactivation of the CC on the access link.

Upon deciding to activate or deactivate one or more CC on the access link, in case the resource partitioning information informed to the DeNB during startup phase (or RRC connection establishment) needs to be updated, the RN sends (S62) a RRC message (such as RRC Reconfiguration Request) to the DeNB to inform the changed resource partitioning request on each CC that will be impacted. The RN can also propose a FDD/TDD subframe configuration, and/or also an R-PDCCH configuration, for these CCs, i.e. at least one of a FDD/TDD subframe and an R-PDCCH configuration. That is, a corresponding the update information is sent only when the device configuration needs to be changed due to a change concerning a component carrier on the first interface.

As an enhanced option, the RN sends the resource partitioning need also for CCs not yet used on the backhaul link but that are configured on the backhaul link such that when the DeNB activates them, it already knows whether it has to apply resource partitioning or not on these CCs. That is, the RN sends the resource partitioning request update related to active CCs on the access link that are also active on the backhaul link. The above mentioned option enables the RN to send the resource partitioning request update related to active CCs on the access link that are also active or inactive (but configured) on the backhaul link.

For example, in case the RN decides to release one or more CC on the access link the resource partitioning is not needed anymore for these CCs. In case of adding one or more CC, the resource partitioning is needed if these CCs are also active on the backhaul link. In case the RN wants to activate one or more CCs on the access link, it informs the DeNB that the resource partitioning is necessary on these CCs if these CCs are also active on the backhaul link. Furthermore, the RN can also send a proposal for the FDD/TDD sub-frame configuration on these CCs on the access link, for example based on the capacity needed on the access link. The proposed FDD/TDD sub-frame configuration can be also sent for CCs already activated but for which the RN would prefer to change the resource partitioning.

The DeNB, upon receipt thereof, can accept, deny or modify the CC changes on the access link indicated by such request (including the need for the resource partitioning and the proposed FDD/TDD sub-frame configuration) based on backhaul load status or other consideration such as interference, and replies to the RN with a response RRC message (S64). In case a CC change on the access link is accepted, the corresponding FDD/TDD sub-frame configuration info for the related CC is provided (S65). If not accepted, the DeNB rejects the changes and the RN should not activate/deactivate the corresponding CCs on the access link. In case the changes are accepted, the resource partitioning on a CC is required/not needed anymore, the DeNB determines/releases the FDD/TDD sub-frame configuration applied on the corresponding CCs of the backhaul link immediately upon receiving the RRC message from the RN, and—in any case—informs the RN (S63 & S65) about the RN sub-frame configuration for each CC. Such message is acknowledged in a signaling "RN Reconfiguration Complete", S66, from the RN to the DeNB. Upon reception of a response message (S64) and/or (re-)configuration message (S65) from the DeNB and initiation of the response message (S66), RN initiates CC activation/deactivation on the access link (S67a) and applies the updated RN subframe configurations. Upon reception of a response message (S66) from the RN, DeNB applies the updated RN subframe configurations (S67b).

Messages of S64 and S65 may optionally be combined into a single message.

A variant consists of having the decision to add or release a CC on the access link at the RN and apply these changes without the need to be accepted/denied/modified by the DeNB. Stated in other words, the changes are always and unconditionally accepted. In this case, the DeNB upon receiving the RRC Reconfiguration Request (in S62) decides the RN sub-frame configuration for the CCs that need to be changed on the access link and provides them to the RN. In this case, the message S64 is not sent from the DeNB to the RN.

Exemplary Embodiment 1a

Alternative RRC Based Approach: Unsolicited UE Capability (not shown in Figure)

The UE capability message is sent from the UE to the eNB when requested or required by the eNB. In contrast to existing specifications, it is proposed that the RN indicates its updated capability actively to the DeNB instead of just providing its capability info to DeNB when required or requested by the DeNB. Hence, the capability message can be used when one or more change on the access link occurred or is necessary to occur and resource partitioning needs to be updated. As enhanced option the RN sends the resource partitioning need also for CCs not yet used on the backhaul link but that are configured on the backhaul link such that when the DeNB activates them, it already knows whether it has to apply resource partitioning or not on these CCs.

In case of any CC change (CC adding or removing or modification) on its access link, the RN indicates the updated CCs status on its access link, and also the updated resource partitioning request on related CCs as the updated capability info to DeNB actively, i.e. based on his own initiative upon detecting the change or need for change. Then, based on the updated capability info of the RN, the DeNB may provide updated RN subframe configurations (including FDD/TDD subframe configuration and R-PDCCH configuration) to the RN accordingly. Besides, upon the reception of the unsolicited UE capability info message from the RN, the DeNB may reply with a message to confirm the message has been received correctly. This message could also contain the acceptance or rejection (or any potential modification) of the proposed changes or simply confirm the reception of the UE capability message, depending on the implementation variant (see exemplary embodiment 1).

Exemplary Embodiment 2

S1/X2 Application Protocol Based Cross Layer Mechanism (See FIG. 7)

Before activating/deactivating or generally changing one or more CCs of the access link upon detecting (S71) such a change or need for change and resource partitioning needs to be updated, the RN informs (S72) the potential CCs change on the access link by a X2AP/S1AP message to the DeNB (AP=application protocol). An acknowledgement is received in step S75, and it includes optionally the acceptance or rejection of the CC changes required by the RN, this depends on the implemented variant (see exemplary embodiment 1). In case of releasing a CC on the access link, the RN may release the CC first and then informs the change to its DeNB or waits for the confirmation or rejection from the DeNB. Besides, in S72, the RN may indicate the updated resource partitioning request of related CCs in the X2AP/S1AP message together with an optional proposed FDD/TDD sub-frame configuration. As enhanced option the RN sends the resource partitioning need also for CCs not yet used on the backhaul link but that are configured on the backhaul link such that when the DeNB activates them, it already knows whether it has to apply resource partitioning or not on these CCs.

Upon receiving the X2AP/S1AP message of S72, DeNB transfers (S73) to its RRC layer the received application protocol layer information on CCs change and/or updated resource partitioning request info and the proposed FDD/

TDD sub-frame configuration of the related CCs. In case the CCs activation/deactivation on the access link is acceptable (S75), the DeNB provides (S76) RN sub-frames configuration (including FDD/TDD subframe configuration and R-PDCCH configuration) of the concerned CCs to the RN. As shown in the particular example of FIG. 7, in case of a CC deactivation on the access link, the resource partitioning on the CC is not needed anymore, and the DeNB decides to release (deactivate), S74, the configured RN sub-frames applied on the corresponding CC of the backhaul link immediately upon receiving the S1AP/X2AP message. The release is done (S78a, S78b) only upon sending/receiving the confirmation from the RN, in S77, that the updated RN subframe configurations have been received.

Upon reception of RN subframe (re-)configuration info of related CCs (carried by a RRC message) or S1AP/X2AP response message (S76, optionally acknowledged by a message, S77), the RN initiates CC adding/removal/modification process on the access link (S78) and applies the received RN subframe configurations.

FIG. 7 is related to use X2-AP messages, in a similar way it would be with S1-AP messages, where S1 eNB Configuration Update and S1 eNB Configuration Update Ack messages are used.

Exemplary Embodiment 3

MAC Based Cross Layer Mechanism (See FIG. 8)

A new MAC CE (Media Access Control Control Element) is introduced to indicate SCell/PCell activation or deactivation (the changed resource partitioning request can be easily derived) of the access link and a potentially resulting proposed RN subframe configuration (including FDD/TDD subframe configuration and R-PDCCH configuration) on these CCs, S82.

In case of detecting a change or need for a change in terms of activating/deactivating or modifying one or more CCs on the access link (S81) and thus the resource partitioning request info informed to DeNB needs to be updated, the RN initiates, S82, a MAC process to indicate the change request on the access link by the new IE (information element) included in a MAC message to the DeNB, potentially together with a proposed RN subframe configuration (including FDD/TDD sub-frame configuration and R-PDCCH configuration) on these CCs. As enhanced option the RN sends the resource partitioning need also for CCs not yet used on the backhaul fink but that are configured on the backhaul link such that when the DeNB activates them, it already knows whether it has to apply resource partitioning or not on these CCs.

For the example of releasing one or more CC on RN access link, a resource partitioning update is necessary, so that the RN may release the CC first, then informs the change to its DeNB by the MAC message or wait for the acceptance or rejection from DeNB depending on the implemented variant (see exemplary embodiment 1).

Upon reception of the MAC message (S82) to indicate the activation/deactivation of one or more CCs on the access link (that corresponds to inform a changed resource partitioning request) and optionally the proposed FDD/TDD sub-frame configuration, the DeNB replies to the RN with a message to confirm, reject or modify the change or simply with an acknowledge message, S84 (dependent on the implemented variant). DeNB forwards to its RRC layer the info on CC change and/or updated resource partitioning request of related CCs and/or proposed FDD/TDD sub-frame configuration. The DeNB initiates a RRC process to provide RN subframe configuration info (including FDD/TDD subframe configuration and R-PDCCH configuration) of related CCs to the RN, S85. In case resource partitioning is not needed anymore, DeNB decides to release the RN sub-frame configuration applied on the corresponding CCs of backhaul link immediately upon receiving the MAC message, S83. The release is done (S87a, S87b) when the DeNB receives the confirmation (S86) that the updated RN subframe configurations have been received at the RN. In case the DeNB can accept or reject a CC change on the access link, the response (accept/deny/modify) can be included in message S85 (as is FIG. 8) or in message S84

Upon reception of the response message (MAC message and/or RRC configuration message) from DeNB, S84, S85, the RN initiates the PCell or SCell change on its access link and applies the updated RN subframe configurations, S87a.

Besides, the following mechanisms are proposed to handle one or more CC change on RN's backhaul link. Those can be implemented alone or in combination with the above mentioned ones, and vice versa.

Figure 9:
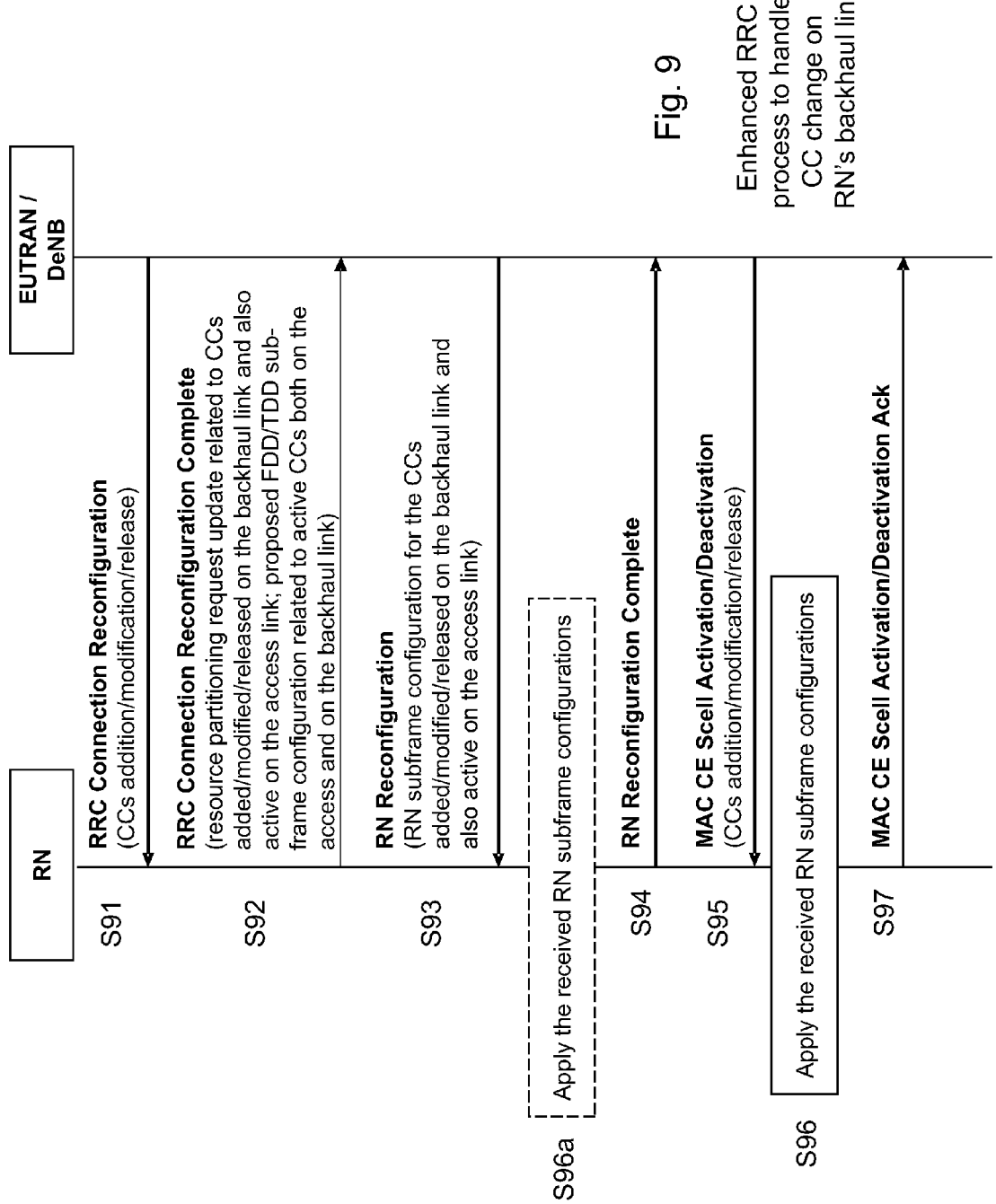
FIG. 9 illustrates an enhanced RRC process to handle CC change on RN's backhaul link as another exemplary embodiment.
Figure 10:
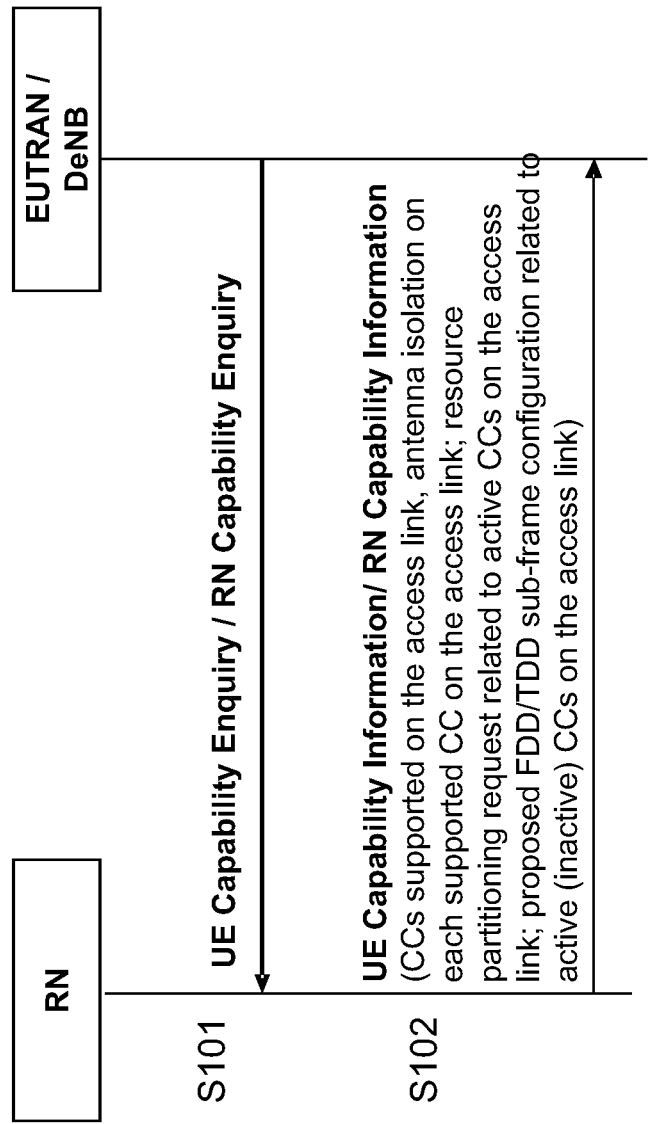
FIG. 10 illustrates a RN capability transfer process as another exemplary embodiment.

Embodiments Related to Backhaul Link Related Scenarios (FIGS. 9 to 10)

Exemplary Embodiment 4

Enhanced RRC Reconfiguration Process (See FIG. 9)

Similarly to above scenarios, here the DeNB (instead of RN) detects one or more CC change on the backhaul link that occurred or is necessary to occur in terms of the component carriers used and RN subframe configurations need to be updated accordingly. Then, the DeNB issues a change request for resource partitioning (from not necessary to necessary or vice versa). A change is detected/signaled per CC depending on the activation or deactivation of the CC on the backhaul link.

The DeNB issue a RRC Connection reconfiguration message, S91, towards the RN. Upon receiving the RRC connection Reconfiguration message to add/modify/remove a CC on the backhaul link, in case the resource partitioning request info on the concerned CC was not reported to the DeNB during RRC connection establishment phase, the RN informs, S92, its updated resource partitioning request info, to the DeNB by a RRC message, such as RRC Connection Reconfiguration Complete message. Other information can also be included in the message, like antenna isolation capability on the concerned CC, activation/deactivation status of related CCs, etc. In particular, when receiving the RRC connection Reconfiguration message to remove a CC on the backhaul link, the RN could release the resource partitioning that was applied on the CC autonomously, if there is any.

Based on the updated capability information related to the concerned CC received from the RN, the DeNB initiates a RN Reconfiguration process, S93, to provide updated configuration info, such as RN subframe configuration of the concerned CC, on per CC basis to the RN. Acknowledgement will be sent in a message, S94.

The configured RN subframe info will be applied either immediately after receiving the reconfiguration message S93 (as expressed by the dotted box labeled S96a) or after receiving a related MAC CE activating/deactivating the CC S95. (S96a and S96 are two options illustrated in the same figure.). This corresponds to configure the subframes used for the backhaul link as MBSFN subframes on the access link.

Exemplary Embodiment 5

Enhanced UE Capability Enquiry Process (See FIG. 10)

The DeNB, upon detection of a change or need for change, intends to activate one or more additional SCells on the backhaul link during RN operation phase, and the RN's requirements on resource partitioning for the concerned CC(s) is unknown. Then, the DeNB initiates UE Capability enquiry process to ask, S101, the RN related capability, such as resource partitioning need of concerned CCs, optionally also the preferred FDD/TDD subframe configuration and R-PDCCH configuration on these CCs, antenna isolation capability of concerned CCs, supported CCs on RN access link, etc Upon reception of UE Capability enquiry message in S101, the RN replies, in S102, to the DeNB with UE Capability Information (or equivalently RN Capability Information) message to inform its related capabilities, such as resource partitioning needs of supported CCs, optionally the preferred FDD/TDD subframe configuration on these CCs, antenna isolation capability of supported CCs, supported CC(s) on RN access link, etc. As enhanced option the RN sends the resource partitioning need also for CCs not yet used on the backhaul link but that are configured on the backhaul link such that when the DeNB activates them, it already knows whether it has to apply resource partitioning or not on these CCs.

Based on the received RN Capability Information as an eNB, the DeNB can configure the new activated SCells on RN backhaul link appropriately, or decide to add/release/modify other CCs based on received RN Capability Information.

If the proposed method is adopted in the related standard specifications, it is detectable using a protocol analyzer.

With one or more of the above exemplary embodiments being implemented alone or in combination, relay systems can benefit efficiently from enhancements attributable to carrier aggregation applied on the access and backhaul interface of the relay systems.

Listing of Some Abbreviations Used

CA Carrier Aggregation
CC Component Carrier
DeNB Donor-eNB
MAC Medium Access Control
RRC Radio Resource Control
RN Relay Node Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The present invention proposes methods and devices to further improve relay systems operating on the basis of carrier aggregation on the access as well as on the backhaul link. Under an aspect of such approach, there is proposed a relay node as a device, comprising a transceiver device, configured to communicate via a first interface with a terminal and via a second interface with a remote network device, wherein communication via the first and/or second interface is configured to operate based on aggregation of plural individual component carriers, and a control device, configured to perform, per component carrier: detection of a change concerning a component carrier on the first interface, sending, responsive thereto, of update information pertaining to at least the first interface towards the remote network device, reception of reconfiguration instructions, implied by the detected change, to be applied on the first interface, and initiation of reconfiguration of the first interface based on the received instructions. Similar approach is applied to a donor eNB as well as to corresponding methods and computer program products.

What is claimed is:

1. A device, comprising:
    a transceiver device, configured to communicate
    via a first interface with a terminal and
    via a second interface with a remote network device,
    wherein communication via the first and/or second interface is configured to operate based on aggregation of plural individual component carriers;
    and
    a control device, configured to perform, for each component carrier:
        detection of a change concerning a component carrier on the first interface,
        sending, responsive to the detection, of update information pertaining to at least the first interface towards the remote network device,
        reception of reconfiguration instructions, based upon the detected change, to be applied on the first interface, and
        initiation of reconfiguration of the first interface based on the received instructions.

2. The device according to claim 1, wherein the control device is further configured to
    send the update information as an update request using a radio resource control message towards the remote network device, or
    send the update information as device capability information update using a capability information message towards the remote network device, or
    send the update information as an application protocol message conformant to the application protocol applied for communication on the second interface towards the remote network device, or
    send the update information as a status report message using a media access control message.

3. The device according to claim 1, wherein
    the control device is configured to send the update information including the device's configuration update request related to active component carriers on the first interface.

4. The device according to claim 3, wherein the control device is configured to send the update information including a proposed device configuration, comprising at least one of a frequency-division-duplex/time-division-duplex sub-frame configuration and an Relay-Physical Downlink Control Channel related to active component carriers on the first interface; and
    wherein the update information is sent only when the device configuration needs to be changed due to a change concerning a component carrier on the first interface.

5. The device according to claim 1, wherein
    the control device is configured to perform, for each component carrier:

reception of a reconfiguration request from the remote network device, based upon a detected change to be applied on the second interface, sending, responsive to the reception of the reconfiguration request, of update information pertaining to at least the first interface towards the remote network device, reception of reconfiguration instructions, implied by the detected change on the second interface, for being applied on the first interface, and initiation of reconfiguration of the first interface based on the received instructions.

6. The device according to claim 5, wherein
the control device is configured to
send the update information as an update request using a radio resource control message towards the remote network device, or
send the update information as device capability information update using a capability information message towards the remote network device, or
send the update information as an application protocol message conformant to the application protocol applied for communication on the second interface towards the remote network device, or
send the update information as a status report message using a media access control message.

7. The device according to claim 5, wherein
the control device is further configured to perform
conditional updating of resource partitioning information towards the remote device, when such information has not been previously already reported.

8. The device according to claim 1, wherein
the control device is configured to perform, for each component carrier,
reception of a capability information update request from the remote network device, and
sending, responsive thereto, of a capability information update pertaining to at least the first interface of the device, towards the remote network device.

9. The device according to claim 1, wherein the device comprises a relay node.

10. A device, comprising:
a transceiver device, configured to communicate
via a second interface with a remote device configured to communicate via a first interface with a terminal,
wherein communication via the first or second interface is configured to operate based on aggregation of plural individual component carriers;
and
a control device, configured to perform, for each component carrier:
receiving of update information pertaining to at least the first interface from the remote device,
sending of reconfiguration instructions to the remote device for being applied on the first interface, and
initiation of reconfiguration of the second interface based on the received update information and/or reconfiguration instructions sent to the remote device.

11. The device according to claim 10, wherein
the control device is configured to:
receive the update information as an update request using a radio resource control message from the remote device, or
receive the update information as device capability information update using a capability information message from the remote device, or
receive the update information as an application protocol message conformant to the application protocol applied for communication on the second interface from the remote device, or
receive the update information as a status report message using a media access control message.

12. The device according to claim 10, wherein
the control device is configured to perform, for each component carrier,
detection of a change concerning a component carrier on the second interface,
sending of a reconfiguration request from the device, implied by a detected change to be applied on the second interface,
receiving, responsive thereto, of update information pertaining to at least the first interface from the device,
sending of reconfiguration instructions, implied by the detected change on the second interface, for being applied on the first interface, and
initiation of reconfiguration of the second interface based on the detected change and/or reconfiguration instructions sent.

13. The device according to claim 12, wherein
the control device is configured to:
receive the update information as an update request using a radio resource control message towards the remote network device, or
receive the update information as device capability information update using a capability information message towards the remote network device, or
receive the update information as an application protocol message conformant to the application protocol applied for communication on the second interface towards the remote network device, or
receive the update information as a status report message using a media access control message.

14. The device according to claim 10, wherein
the control device is configured to perform, for each component carrier,
sending of a capability information update request to the remote device, and
receiving, responsive to the sending, of a capability information update pertaining to at least the first interface of the device, from the remote device,
deciding the reconfiguration of the second interface based on the received capability information.

15. The device according to claim 10, wherein the device comprises an eNodeB.

16. A method, comprising:
communicating via a first interface with a terminal and via a second interface with a remote network device, wherein communication via the first and/or second interface is based on aggregation of plural individual component carriers, and
performing, for each component carrier:
detecting of a change concerning a component carrier on the first interface,
sending, responsive to the detecting, of update information pertaining to at least the first interface towards the remote network device,
receiving of reconfiguration instructions, based upon by the detected change, to be applied on the first interface, and
initiating reconfiguration of the first interface based on the received instructions.

17. The method according to claim 16, further comprising performing, for each component carrier,
- receiving a reconfiguration request from the remote network device, implied by a detected change to be applied on the second interface,
- sending, responsive to the receiving, of update information pertaining to at least the first interface towards the remote network device, reception of reconfiguration instructions, implied by the detected change on the second interface, for being applied on the first interface, and
- initiating reconfiguration of the first interface based on the received instructions.

18. A method, comprising:
communicating via a second interface with a remote device configured to communicate via a first interface with a terminal, wherein communication via the first or second interface is configured to operate based on aggregation of plural individual component carriers, and
performing, for each component carrier:
- receiving update information pertaining to at least the first interface from the remote device,
- sending reconfiguration instructions to the remote device for being applied on the first interface, and
- initiating reconfiguration of the second interface based on the received update information and/or reconfiguration instructions sent to the remote device.

19. The method according to claim 18, further comprising performing, for each component carrier,
- detecting a change concerning a component carrier on the second interface,
- sending a reconfiguration request from the device, implied by a detected change to be applied on the second interface,
- receiving, responsive thereto, of update information pertaining to at least the first interface from the device,
- sending reconfiguration instructions, implied by the detected change on the second interface, for being applied on the first interface, and
- initiating reconfiguration of the second interface based on the detected change or reconfiguration instructions sent.

20. A computer program product embodied on a non-transitory computer-readable medium comprising computer-executable components which, when the program is run on a computer, are configured to execute the method according to claim 16.

21. A computer program product embodied on a non-transitory computer-readable medium comprising computer-executable components which, when the program is run on a computer, are configured to execute the method according to claim 18.

* * * * *